United States Patent [19]
Wicks et al.

[11] Patent Number: 5,796,394
[45] Date of Patent: Aug. 18, 1998

[54] USER INTERFACE AND RULE PROCESSING FOR A PERSONAL COMMUNICATIONS ROUTING SYSTEM

[75] Inventors: James E. Wicks, Tarrytown, N.Y.; Kazuto Mugura, Cupertino; Toshiya Fujii, Menlo Park, both of Calif.

[73] Assignees: Sony Corporation, Tokyo, Japan; Sony Corp. of America, New York, N.Y.

[21] Appl. No.: 935,925

[22] Filed: Sep. 23, 1997

Related U.S. Application Data

[63] Continuation of Ser. No. 538,330, Oct. 3, 1995, abandoned.
[51] Int. Cl.$^6$ .................................................. H04N 3/00
[52] U.S. Cl. ................................... 345/329; 345/340
[58] Field of Search ................................ 345/326, 327, 345/328, 329, 330, 331, 332, 339, 340, 341, 342

[56] References Cited

U.S. PATENT DOCUMENTS

| | | | |
|---|---|---|---|
| 5,195,086 | 3/1993 | Baumgartner et al. | 395/330 |
| 5,483,631 | 1/1996 | Nagai et al. | 395/329 |
| 5,537,546 | 7/1996 | Sauter | 395/331 |
| 5,539,886 | 7/1996 | Aldred et al. | 395/331 |
| 5,572,248 | 11/1996 | Allen et al. | 395/330 |

*Primary Examiner*—Matthew M. Kim
*Assistant Examiner*—Steven P. Sax
*Attorney, Agent, or Firm*—Pasquale Musacchio; Jerry A. Miller

[57] ABSTRACT

A user interface provides a uniform control scheme among different devices in a personal communications routing system. The system allows devices such as a personal computer, personal information communicator, pager, fax machine and base station to be operated with a standard twelve key telephone keypad controller for the purpose of accessing electronic messages such as e-mail, voice-mail, fax transmissions, etc. Handheld communicators are docked with the devices to provide wireless transmission between a base station and numerous devices in a multi-user environment. The base station receives electronic messages for the users in, e.g., an office and routes the messages to a device as the user instructs. The user is able to perform operations on the messages such as reading, responding, deleting, etc., by using the keypad. A visual indication of user designated message bins, along with icons to represent messages received, is used to special advantage by coordinating the bin layout with the arrangement of keys on the keypad. Another feature of the system is that rules can be predefined to route, screen or otherwise manipulate the messages. The rules are applied by the base station to each incoming message. Different users can have different rules such as automatic forwarding of messages, automatic paging upon receipt of a message and sorting of messages by sender's name or time of day.

37 Claims, 12 Drawing Sheets

FIG. 7

USER INTERFACE AND RULE PROCESSING FOR A PERSONAL COMMUNICATIONS ROUTING SYSTEM

This is a continuation of application Ser. No. 08/538,330 now abandoned, filed on Oct. 3, 1995 which is hereby incorporated by reference.

FIELD OF THE INVENTION

This invention relates generally to electronic communications systems and more specifically to an electronic communications routing system for distributing and accessing electronic information.

BACKGROUND OF THE INVENTION

Electronic communications have become increasingly varied and complex. Today, a user is faced with different communication networks such as telephone, paging or Internet networks. Each of these networks has one or more particular data formats or information types such as electronic mail (e-mail), voice-mail messages, facsimile (fax) transmissions and other forms of data, voice or image transmissions available from the telephone network alone. The electronic communication systems associated with these networks allow a user to receive and send such varied information by using devices such as a personal computer (PC), telephone, fax machine, paging device, personal information communicator (PIC), etc.

Not only do the information types of each communication network have their own unique communication devices, but each device has a different user interface. Thus, a user is faced with many types of information types from different communication networks, each requiring the user to master one or more different communication devices having a different user interface.

Prior art methods have attempted to integrate some of the different communication networks, information types, devices and user interfaces. For example, a pager may be equipped with a small display panel so that a user of the pager can not only receive a notification to call a telephone number, but may also receive a short text message similar to a primitive e-mail system. Another example is the integration of fax transmissions with computers. By installing a computer fax card into a PC, a user of the PC is then able to send and receive fax transmissions via the PC. By creating software that is compatible with the PC's native operating system the fax card may have some uniformity with respect to the other user interfaces executing on the PC.

However, while the approach of placing a fax card in a PC successfully integrates the fax and PC devices, and achieves a degree of integration with respect to faxes and e-mail information types, it only provides a limited degree of user interface integration since the application programs to access e-mail and fax transmissions remain separate. The application programs are typically developed independently by different software developers and may only share superficial similarities in their user interfaces. Transmission networks are not integrated in this computer/fax card approach because it is still necessary for the computer to be connected to both a local area network (LAN) to receive and send e-mail, and to a standard or cellular telephone network to handle the user's fax transmissions.

Additional shortcomings of today's attempts to integrate diverse communications networks become apparent when such integrated systems are used by several people simultaneously, as in an office environment. In such multi-user environments it is important for a person other than the primary user (e.g., a secretary) to access and manipulate a primary user's electronic communications information. For example, a secretary may need to observe a user's received faxes to alert the user that an important communication needs immediate attention. Also, a secretary may screen a user's telephone calls, voice-mail messages and e-mail. Co-workers may need to access a given user's electronic communications to distribute or assume that user's job responsibilities. While telephone messaging has evolved to provide sufficiently option-rich environments, these systems are difficult to use efficiently because the interface is predominantly audio. Other networks, such as e-mail and paging do not have many of the desired control options and lack the flexibility to handle multi-user environments. To provide such options in e-mail and paging networks in their present standalone schemes would mean that the user interfaces for these networks would grow ever more complicated and incompatible with each other.

Therefore, it is desirable to produce an efficient and versatile system that integrates different networks, information types, communications devices and user interfaces.

SUMMARY OF THE INVENTION

The present invention provides an integrated personal communications routing system which allows a user to control different devices through a common interface. The most basic of the interfaces is a twelve key telephone keypad that is present in a handheld communicator. Each user is assigned a handheld communicator and each communicator has a unique identification. Various devices in the communications system, such as personal computers, personal information communicators, fax machines, pagers, etc., may be equipped with a docking station so that the handheld communicator of a user can be placed in the docking station and used as the link between the device and a base station.

There are one or more base stations per system. Each system is designed to handle the traffic in a small group of users, as would be the case in a small office environment. All communications to the office go through the base station. The base station keeps track of messages for different users and routes the messages accordingly. The base station is operable by a user interface designed to be efficiently operated with a twelve key keypad so that all user interfaces in the office are effectively the same, no matter what type of information is being accessed by a user.

A preferred embodiment of the user interface provides message "bins" on the display screen of the base station or any other host device that is running the user interface. Up to 9 bins are arranged on the display screen in the format of the keys labeled 0–9 on a twelve key keypad. The bins are selected by a user by depressing the key on the keypad corresponding to the bin number and position. Bins are filled with icons that indicate a voice-mail, e-mail, fax or other message has been received for the user. Selection of a bin brings the user to successive screen displays and options for accessing the messages.

One embodiment of the invention uses a method allowing first and second users to retrieve and display information in an electronic communications system. The system includes a processor coupled to a display screen, memory, user input device and first and second electronic communication networks. Each user has a unique user identifier. The method uses the steps of: using the processor to display the first user's identifier on the display screen in a first area of the display screen; using the processor to display the second user's identifier on the display screen in a second area of the display screen; using the processor to receive first information for the first user from the first network, store the first information into the memory, and display a first icon within the first area in response to the receipt of the first information; using the processor to receive second information for the first user from the second network, store the second information into the memory, and display a second icon within the first area in response to the receipt of the second information; accepting signals from the user input device to specify a user; and if the specified user is the first-user then performing the step of displaying at least a portion of the information for the first user on the display screen.

BRIEF DESCRIPTION OF THE DRAWINGS

FIG. 7 is a fourth screen display;

DETAILED DESCRIPTION OF A PREFERRED EMBODIMENT

Further details on the system components and operation of the present invention may be found in co-pending patent application Ser. No. 08/538,690 [INTELLIGENT BULLETIN BOARD LOCAL PERSONAL COMMUNICATIONS ROUTER, 50J1340]. Further details on the design of the base station component of the system can be found in co-pending patent application Ser. No. 08/538,329 [WALL MOUNTED PERSONAL COMMUNICATIONS ROUTING SYSTEM, 50J1337, now U.S. Pat. No. 5,673,169]. Both of these co-pending patent applications are hereby incorporated by reference as if set forth in full in this document.

System Description

Figure 1:
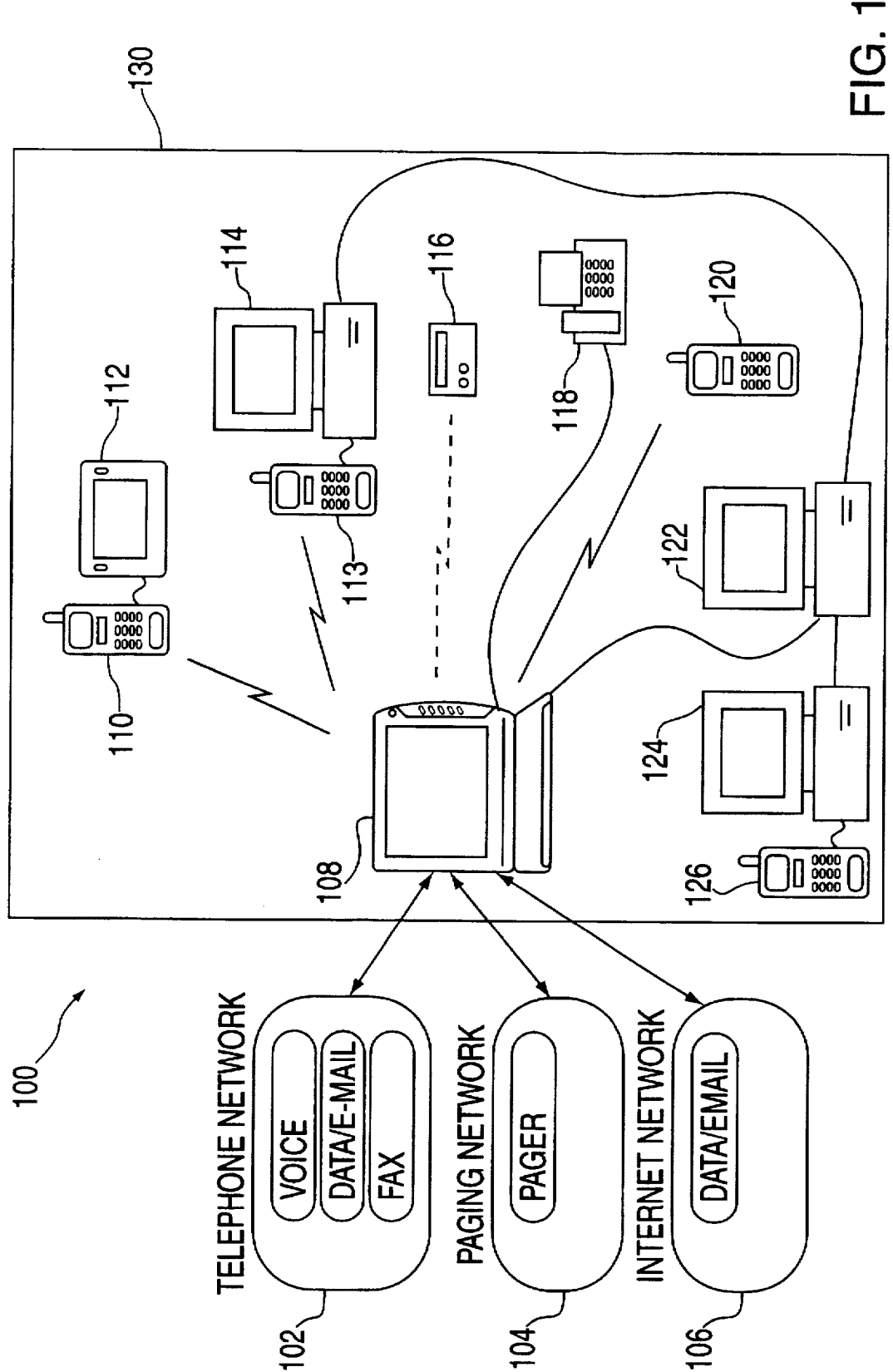
FIG. 1 is a system-level diagram of the personal communications routing system of the present invention.

FIG. 1 is a diagram of the personal communications routing system 100 of the present invention. The heart of the system is base station 108 which is used to route information among various communications devices such as personal information communicator (PIC) 112, personal computer (PC) 114, pager 116, fax machine 118, handheld communicator 120, PC 122 and PC 124. Note that communication with some devices, such as 112, 114 and 126, may be via a handheld communicator such as 110, 113 and 126, respectively, that is connected to, or "docked" with, the device. In this specification, the term PIC encompasses devices such as the MagicLink™ device manufactured by Sony Corp., or other so-called "palmtop" computer, personal digital assistant (PDA) or similar device. Typically, base station 108 and devices 110–126 are located in a home, office, or other local area as indicated by boundary 130.

Base station 108 receives information from, and sends information to, the outside world by communicating with various electronic communication networks. Some networks are shown in FIG. 1, such as telephone network 102, paging network 104 and Internet network 106. Each of these networks represents a suitably distinct communication infrastructure that has its own data formats (or information types), protocol, devices and user interfaces. For example, the telephone network uses telephone dialing devices such as hardwired or cellular telephones having standard twelve key keypads to communicate analog or digital voice information. These aspects of the telephone system are different from, and incompatible with, a network such as the Internet which routes data between computers by using specialized Internet protocols (e.g., transmission control protocol/Internet protocol (TCP/IP), file transfer protocol (FTP)) and user interfaces (e.g., native operating system commands or World Wide Web (WWW) browsers) that make use of the computer's display screen, mouse and keyboard to achieve a user interface. Similarly, a paging network has its own data formats, protocol, devices and user interfaces. Note that several data formats may be used within a given network as shown in FIG. 1 by voice, data/e-mail and fax formats within telephone network 102.

Other communication networks exist, such as the Global Positioning Satellite (GPS) system, packet radio devices such as CDPD, etc., which may be used with the communications routing system of the present invention. Also, any form of information transfer made possible by the network is adaptable for use in the system of the present invention. For example, transmissions of audio and video information are possible over the Internet. The present invention provides a design to efficiently handle the routing of all types of information on all networks as discussed below. FIG. 1 is merely illustrative of selected networks used in a preferred embodiment of the invention.

As shown in FIG. 1, base station 108 communicates with various devices within local area 130. A preferred mode of communication is via handheld communicators such as 110, 1113, 120 and 126 which conform to the CT-2 standard currently in use for digital portable telephones in Japan. In accordance with such a system up to nine individual user handsets may communicate with each other and a base station. In a preferred embodiment, handheld communicators are provided with docking connections to various devices such as PIC 112 and PCS 114 and 126. Docking connections may be provided to any additional known type of communication devices such as fax machines, pagers, television monitors, etc.

Alternatively, base station 108 can communicate with devices via the devices' native communication networks. As shown in FIG. 1, base station 108 can communicate with pager 116 by means of the paging signals broadcast from the paging network. In other words, base station 108 can send information over a phone line to paging network 104. The information is broadcast from the nearest paging transmitter and received by pager 116. This radio connection is shown symbolically in FIG. 1 by the dashed line between base station 108 and pager 1116. Similarly, base station 108 may communicate with fax machine 118 via the telephone network. Another possibility is to have a hardwired connection between fax machine 118 and base station 108. Such a direct link may be useful in some situations where the traffic between the fax machine and the base station is heavy. A radio connection using the handheld communicator coupled to, or docked with, the fax machine is a possible arrangement. Other possibilities are infrared, fiber optic, radio frequency or other communication links.

Typically, a local area will already have a local area network (LAN) with associated servers, routers and other equipment. The base station may connect to the network to provide yet another communications path to devices on the network. An example of this is illustrated in FIG. 1 where the base station is connected to computer 122 via a LAN connection shown as a solid line. Computers 124, 122 and 114 are all interconnected via the LAN so that the base station may transfer information to and from the computers over the LAN. In the preferred embodiment, communication to devices via radio transmission using the CT-2 standard with the handheld communicators is the primary mode of communication between base station 108 and the devices. The other modes of communication discussed above are secondary modes and may be utilized to advantage in ways analogous to the primary mode as discussed below. For example, the base station can communicate with PCS over the LAN to give the system more range over the hardwired LAN channels.

In a preferred embodiment, handheld communicators act both as telephone handsets and as communication adapters for the routing system. This means that a user of the system can send and receive voice communications over the handheld communicators. Since a handheld communicator is mobile and dockable with the various communications devices within the local area (e.g., an office) this means that the user is always close to a telephone device for sending and receiving voice messages. Also, because each handheld communicator has a unique identification within the office, the user can usually be contacted anywhere in the office during the business day. Another advantage of this scheme is that the combination of base station and handheld communicator allows messages or other information destined for a user to be centrally controlled. This is true no matter what information type is being transferred or which communications network is transferring the information.

For example, a user who first shows up for work would check the display screen on the base station which is located near the front door. The user interface executing on the base station shows graphically whether the user, or any other user, has electronic mail, voice messages, faxes, etc. By pressing a key on the handheld communicator or the base station the user can retrieve voice messages over the handheld device, can have electronic mail and faxes delivered to the user's computer, can have a fax printed out, can copy the information to other users, can place the information in a "low priority" stack, or perform other functions. Further, a preferred embodiment allows a user to predefine "rules" for automatically handling certain types of information that arrive without requiring any action on the user's part. Details of the user interface and rule handling are provided in the discussion below.

When the user is working at a desk with a computer, the handheld communicator is docked to the computer. This provides the base station with a wireless communication path between the base station and the user's computer. In operation, the base station transmits and receives information to/from the user's computer through the handheld communicator. Since the handheld communicator is identified with the user, it is a simple matter for the base station to route information designated for the user to the user regardless of the user's location in the office. If the user wishes information to be transferred to the user's PIC the user simply docks the handheld communicator with the PIC.

The system can be expanded by the addition of base stations to handle more handheld communicators and devices. The additional base stations (not shown in FIG. 1) are connected in a "daisy-chain" fashion so that a base station may communicate with adjacent base stations in the chain. Other connection arrangements are possible. With multiple base stations, one or more of the base stations are connected to one or more communication networks. The base stations connected to the communication networks receive electronic messages and other information from the communication networks and send the information to the other base stations when the information is destined for users associated with the other base stations. A preferred embodiment uses RJ11 connections on the base stations coupled with standard telephone line cord. To increase throughput a base station may be coupled to redundant lines for a single communication network. For example, multiple telephone lines can be connected to a single base station. Multiple base stations may also each have one or more telephone lines.

Figure 2:
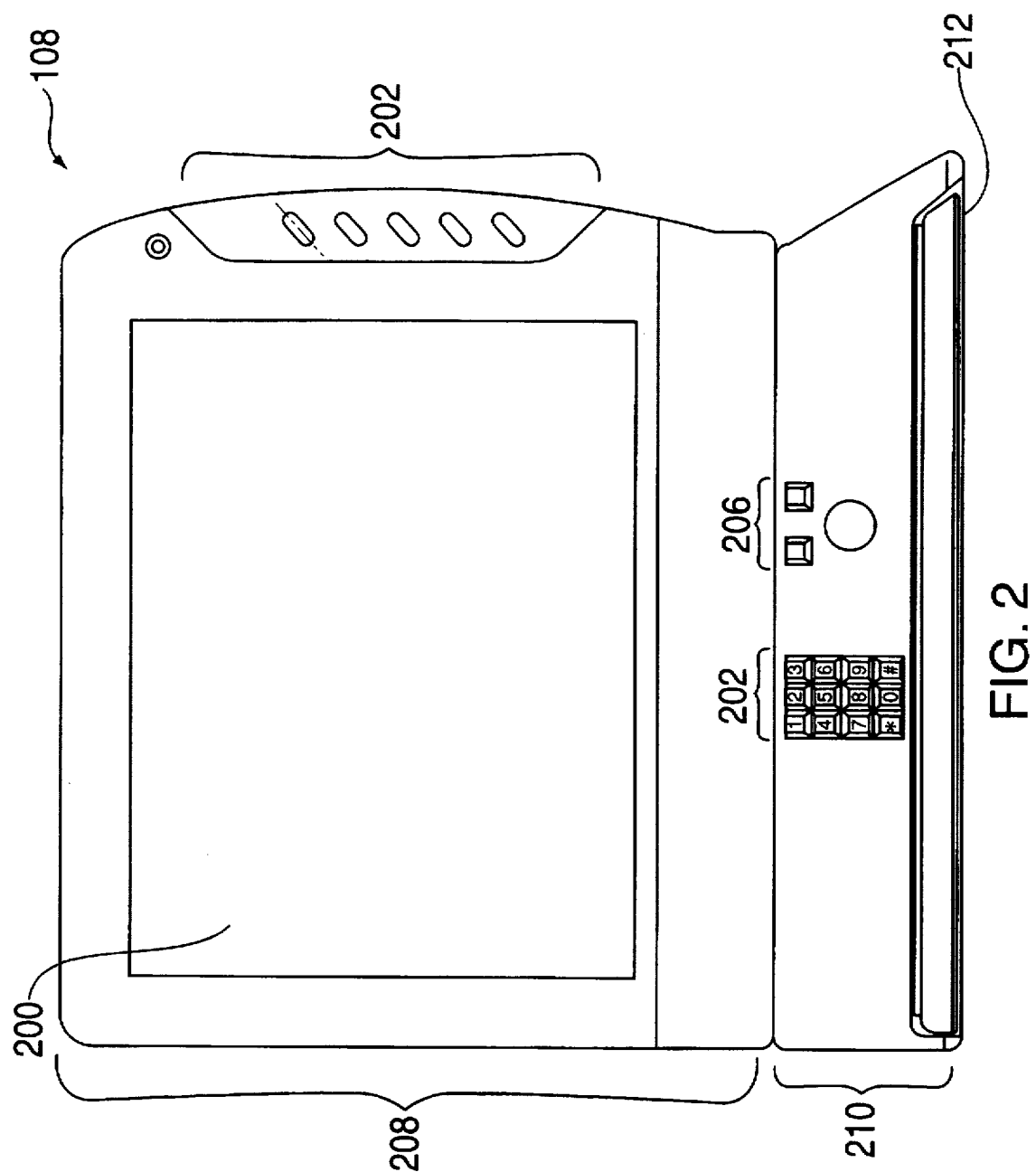
FIG. 2 shows an enlarged illustration of the base station of FIG. 1.

FIG. 2 shows an enlarged illustration of base station 108 in FIG. 1. In general, identical numbers used to designate items in different Figs. indicate the same item. In FIG. 2, base station 108 includes a housing having a display portion 208 and a control portion 210. Display portion 208 includes display screen 200 and custom controls at 202. Control portion 210 includes a twelve key keypad at 204 and trackball and associated buttons at 206. Display portion 208 and control portion 210 are hinged so that base station 108 is adaptable to be mounted on a wall with both the display portion and control portion flush with the wall. Further, control portion 210 includes a pull-out keyboard 212 shown in its unextended position within the housing of control portion 210. For more information on base station 108 refer to the co-pending patent application referenced at the beginning of this section.

An important feature of base station 108 is that it is provided with a twelve key keypad at 204 in addition to full keyboard 212, and other controls at 206. Since each user's handheld communicator also includes a twelve key keypad, and since each user is able to dock the handheld communicator to various devices at various locations throughout the office, this means that the user is able to operate each communications device within the office with a single user interface. The base station includes an antenna assembly at 202 that is integral to the body of the base station for transmitting and receiving radio signals from the handheld communicators. Alternatively, the antenna can be mounted externally on the base station.

Figure 3:
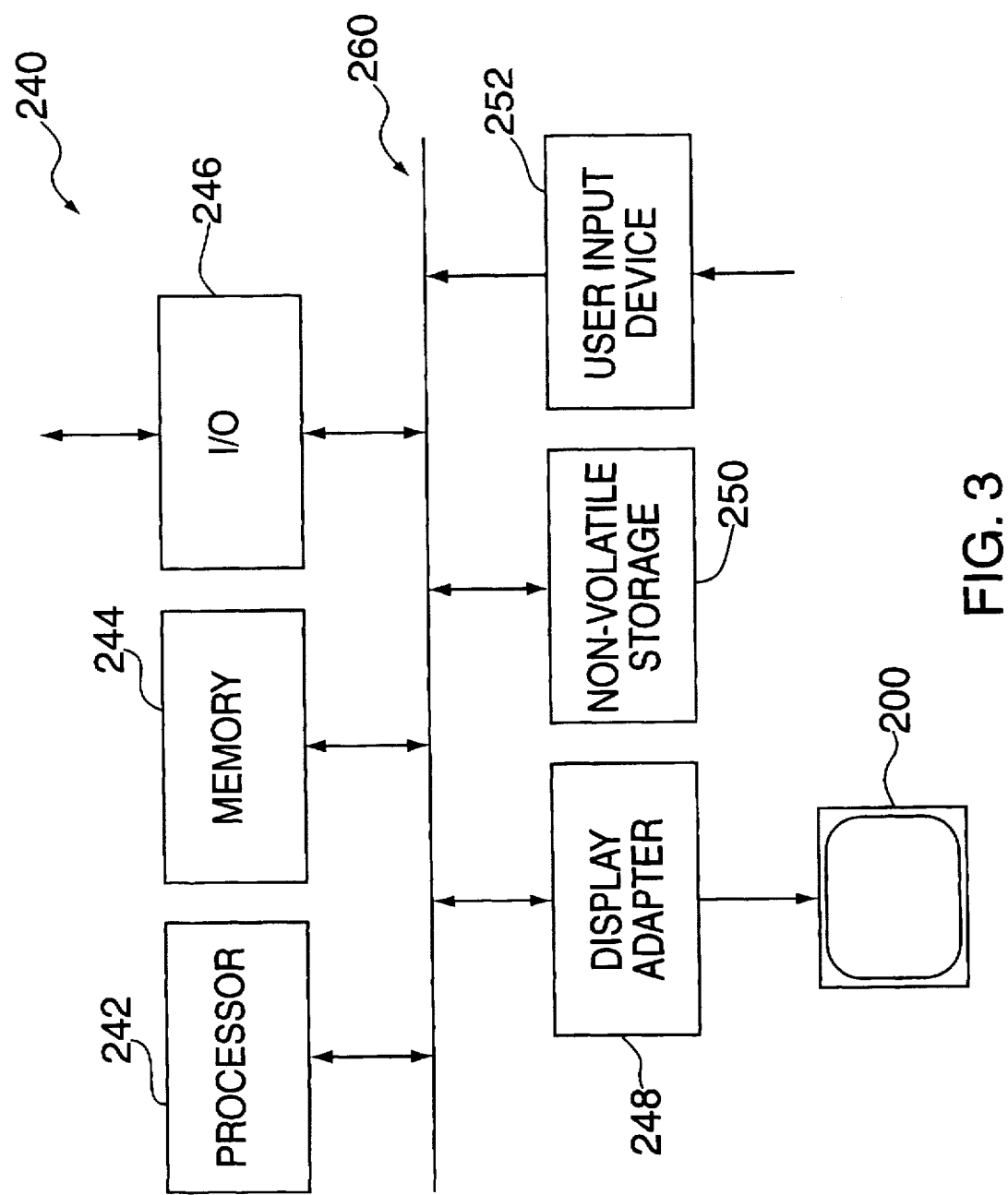
FIG. 3 shows basic subsystems within the base station.

User Interface FIG. 3 shows basic subsystems 240 within base station 108 for performing base station functions and for executing a user interface. Basic subsystems 240 are used to execute software of the present invention and to interface with the outside world. Processor 242, memory 244, input/output (I/O) adapter 246, display adapter 248, non-volatile storage 250 and user input devices adapter 252 exchange data via bus 260. Display adapter 248 communicates with display screen 200 to display alphanumeric text and graphics. I/O adapter 246 interfaces with external devices such as communications networks, peripherals, additional memory or storage devices, other computers, etc. (not shown). User input devices adapter receives input signals from, e.g., a keyboard, mouse, trackball, keypad, etc. (not shown). Non-volatile storage 250 can be a hard disk, read-only memory (ROM) or other media. Processor 242 and memory 244 are a standard central processing unit for performing computer operations and a random access memory (RAM) for storing information. For example, processor 242 can be an 80×86 chip. The preferred embodiment uses a relatively small amount of RAM (about 6 megabytes)

since the base station is intended as a router of information rather than a repository of information. The operation of these subsystems is well-known in the art.

FIG. 3 is illustrative of but one configuration of subsystems suitable for use in the base station of the present invention. It should be apparent that subsystems can be added to, or taken away from, those shown in FIG. 3 while still providing a suitable architecture to practice the present invention. Further, the entire base station can be implemented in a standard computer system such as an International Business Machines (IBM) PC or an Apple Macintosh type of computer, if desired. Other components or devices discussed in connection with the personal communications routing system of the present invention will include similar subsystems and perform similar tasks. For example, the subsystems of FIG. 3 are present in the PICs and PCS of FIG. 1 and, to some extent, in the remaining devices of FIG. 1, also. Various modifications to the processing architecture shown in FIG. 3 may be made without departing from the scope of the present invention.

Figure 4:
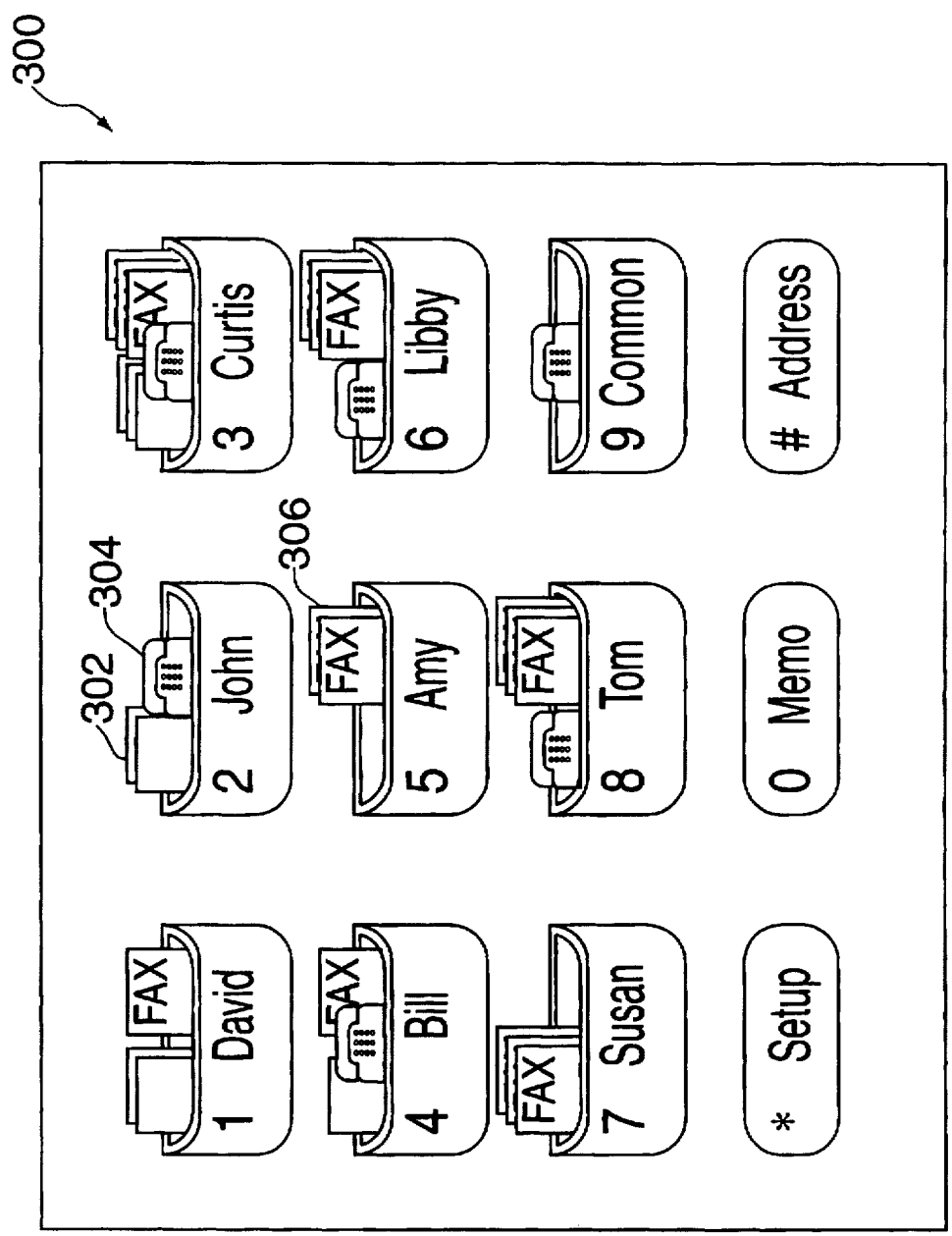
FIG. 4 is a screen display of the user interface of the present invention.

FIG. 4 is a screen display 300 of the user interface of base station 108 of FIGS. 1 and 2. In FIG. 4, nine "in" boxes are shown as bins 1-9. Each of bins 1-8 corresponds to a user of the system, i.e., a worker in the office, and is labeled with the first name of each worker. Bin 9 is a "common" bin whose information is directed to anyone at the office. As information from electronic communication networks such as the telephone network, paging network or Internet is received by the base station, the base station determines who the information is designated for, or addressed to, and places an icon in the appropriate bin of the intended recipient. Thus, the users are provided with "universal" mailboxes that provide a single point for checking on the many different types of information that can be destined for a specific user.

Icons shown in FIG. 4 are of three forms, corresponding to three information types. E-mail icons such as 302 are rectangular with a darker, smaller rectangle in the upper right-hand corner designed to suggest a letter with a stamp. Telephone message (i.e., voice-mail) icon 303 suggests a telephone while fax icon 306 represents a page labeled "FAX". Thus, in FIG. 4, it is easily seen that screen display 300 shows that user "David" has two voice-mail messages and one fax. User John has an e-mail message and a voice-mail message. User Curtis has three e-mail messages (or more), a voice-mail message and three fax messages. In a preferred embodiment, even if more than three messages of a type are present in a user's bin only three icons of that type will be shown in the bin. An alternative is to place a small number on the message type icon to indicate how many messages of that type are waiting for the user. The preferred embodiment also makes extensive use of color (not shown in the Figs.) to render the bin display in a pleasing and easily discernible style.

A user can direct the base station to provide the contents of a message in several ways. First, the user may select their bin by depressing the key of the base station keypad that corresponds with the user's bin. For example, user Curtis would press the key labeled 3 on the keypad shown in FIG. 2. The correspondence between the keypad and the bins is reinforced by having the bins arranged in the same layout as the keypad with the same labeling on the bins as on the keypad keys. In a preferred embodiment, the bins are even given the look of keys. This provides the user with a very intuitive and simple interface. Because of the key-to-bin analogy the user instantly knows how to access their bin, or another user's bin, with a single keypress without having to navigate through multiple menus, reading text and clicking icons as in traditional user interfaces. Since the keypad is a ubiquitous interface in this system, being present at the base station, telephone handsets and handheld communicators; the user is always provided with a single essential interface to operate the system. The bins and buttons that appear on the screen during execution of the user interface always correspond to the twelve key keypad whenever possible so that the user can use the control options of the system with the same simple keypad interface. The bins, themselves, behave as buttons so that if a user "clicks" on a bin using the trackball and a pointer the effect is the same as if the corresponding keypad key were depressed. Where a user is away from the base station or other device with substantial display ability so that the bin screen cannot be shown audio or other means of communication can be used to assist the user. For example, when the user is operating the user interface from a standalone handheld communicator or a telephone, the system would respond to the user's keypresses similar to a voice mail system.

Where multiple base stations are used, bins on the additional base stations can be accessed with a "pre" keypress such as by pressing the asterisk key. For example, if Curtis needed to access a user's bin on a second base station he could do so by depressing the asterisk key and then the number of the user's corresponding bin which appears on the second base station's user interface display.

A user may also select their bin by using a pointing device and selection box. For example, a selection box is shown around bin 3. By using the trackball at 206 of FIG. 2 a user may move the cursor to any of the bins and then depress one of the trackball buttons to select the bin. Yet another way for a user to select a bin is to depress a key on the handheld communicator that is identified with the user. A specially designated key could be used, or merely any key could be pushed on the handheld communicator as the user first enters the office.

When a user selects their bin, a dialogue box appears to ask for the user's password. Once the password has been entered the user is shown an "In Box" window. In the following discussion, it is assumed that user "Curtis" has accessed his In Box by depressing the numeral "3" on the twelve key keypad on the base station and has correctly entered his password.

Figure 5:
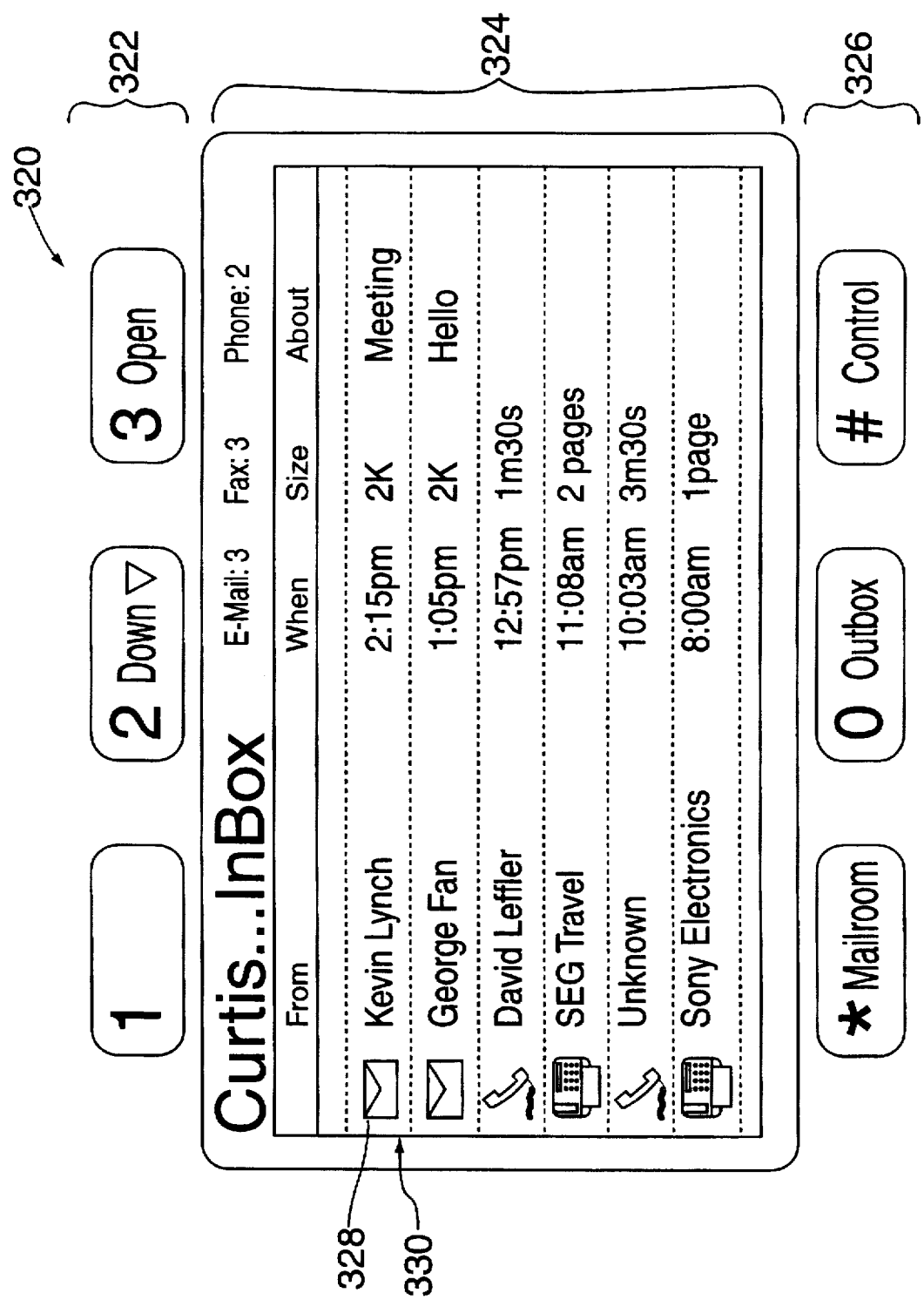
FIG. 5 is a second screen display.

FIG. 5 is a screen display 320 including In Box window 324 displayed on the display screen in response a request by Curtis to access his messages. The In Box window includes an In Box list which uses one row per message. The first item in each row is an icon indicating the information type of the message. The second item is the name of the sender, if known. The third item is the time the message was received. The fourth item is the size of the message and the fifth item is a brief word or two indicating what the message is about. Note that In Box window 324 overlays the previous bin display of FIG. 4, and that some buttons of the keypad image of the screen of FIG. 4 remain visible at 322 and 326 although these buttons no longer have the "bin" shapes of FIG. 4 and appear, instead, as buttons.

Buttons 1-3 at 322 allow the user to move up and down among the items in the In Box list within In Box window 324. Button 1 corresponds to moving "up" in the In Box list while button 2 corresponds to moving "down" in the list. In FIG. 5, button 1 is not labeled "up" since the user is initially viewing the top of the list and cannot move upward any further in the list. The user activates the screen buttons by using the keypad on the base station, the user's handheld communicator, the trackball and associated controls (see FIG. 2) to move a pointer. Other forms of control are possible. From the screen of FIG. 5, button 3 is used to open alternative In Box lists such as lists that the user has created and previously stored. For example, a user may wish to place items of lesser interest or low priority in secondary In Box lists and address them at a later time.

Buttons on the display screen, and keys on the keypad, labeled "*,""0" and "#" allow the user to access more options relating to, respectively, re-routing mail to one or more persons, viewing the user's "Out Box," and using more advanced control features of the user interface.

An advantage of the user interface of the present invention is that it is a very simple button oriented interface based on the familiar twelve key telephone keypad. Since, as discussed above, the user is able to "dock" their personal communicator, which includes a keypad, with different devices, the same user controls are used on each of the different devices. Provided that the device has display capability to show screens similar to the screens discussed herein for the base station the same visual interface can also be used on the devices. Where a device does not have sufficient display ability, limited display or voice communication can be used to give information about which screen and option the user is currently in. Another embodiment of the invention could use a handheld communicator with graphics display capability to insure that devices with limited display capability, such as pagers, can still execute the user interface of the present invention.

Even with devices, such as pagers, which may not have sufficient display screen resolution to successfully implement the screens discussed herein, the user interface is simple enough that a user may operate the interface "blindly" by pushing keys without visual feedback, or with only a limited display response such as a beep along with an alphanumeric abbreviation of which screen or mode the user is currently in. E-mail messages can be displayed on the pager's small screen while voice-mail messages can be played back through the handheld communicator.

For example, a PC such as PC 124 of FIG. 1 can execute the user interface discussed in connection with FIG. 4 and the following Figures. This allows the user to download, or off-load, the messages from the base station to the PC or other workstation or device of their choosing and to manipulate the messages in an identical manner as if they were at the base station. Thus, the present invention provides a single, simple user interface among various networks, data formats and devices. For more information on the routing and distributed processing ability of the system of the present invention refer to the co-pending patent application INTELLIGENT BULLETIN BOARD LOCAL PERSONAL COMMUNICATIONS ROUTER referenced at the beginning of this section.

Shaded bar 328 indicates that the item at 330 is currently focused on. Other items may be focused on by moving shaded bar 328 by using the up and down buttons. The user accesses, or selects, the item focused on by depressing a key, such as keys 4–9, or by other means. In this case, item 330 is an e-mail message.

Figure 6:
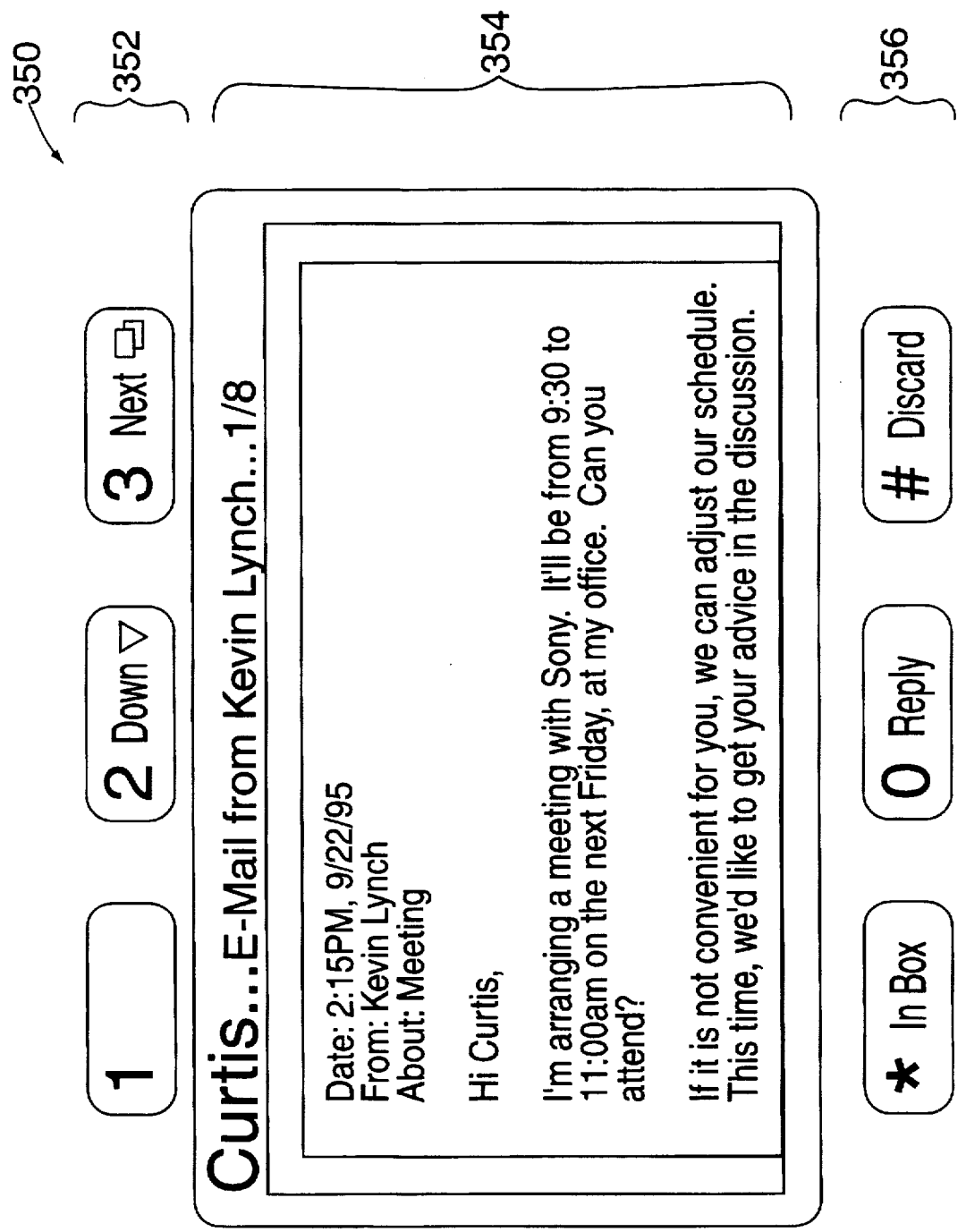
FIG. 6 is a third screen display.

FIG. 6 is a screen display 350 generated on display screen 200 (FIG. 2) of the base station in response to the user's selection of item 330. The text of the e-mail message is displayed in e-mail window 354. Similar to FIG. 5, some buttons remain visible at 352 and at 356, however, the functions of the buttons is changed. Button 3 is now used to move directly to a window for the next item in the In Box list of FIG. 5. The buttons at 356 correspond to (from left to right) returning to the In Box window display, sending a reply to the originator of the e-mail message currently displayed, and discarding the currently displayed e-mail message.

Figure 7:
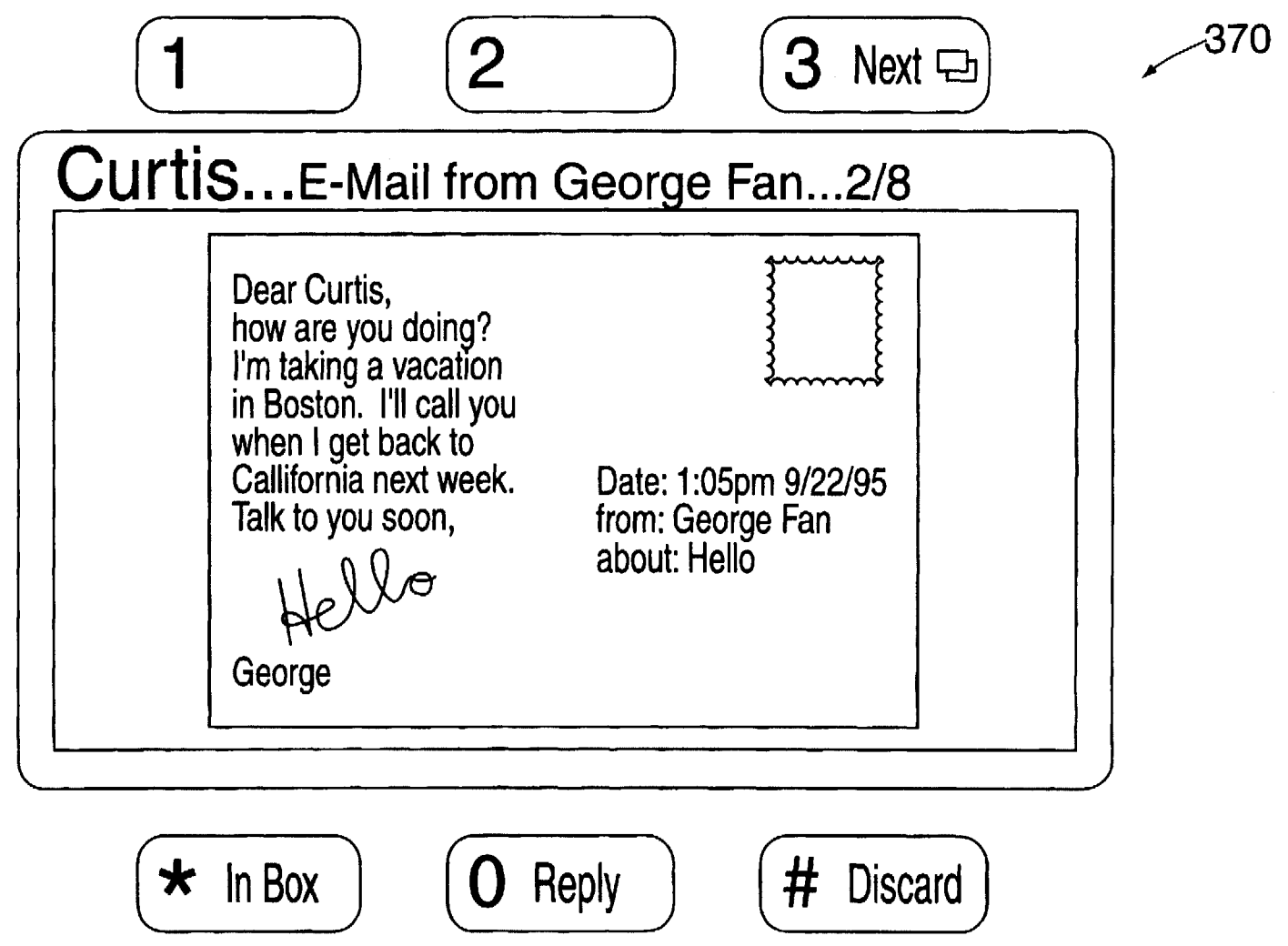

FIG. 7 shows screen display 370 which is the screen display a user would see after activating the "Next" button, button 3, from the screen display of FIG. 6. Note that FIG. 7 shows the item from sender "George Fan" as an e-mail message that includes graphics.

Figure 8:
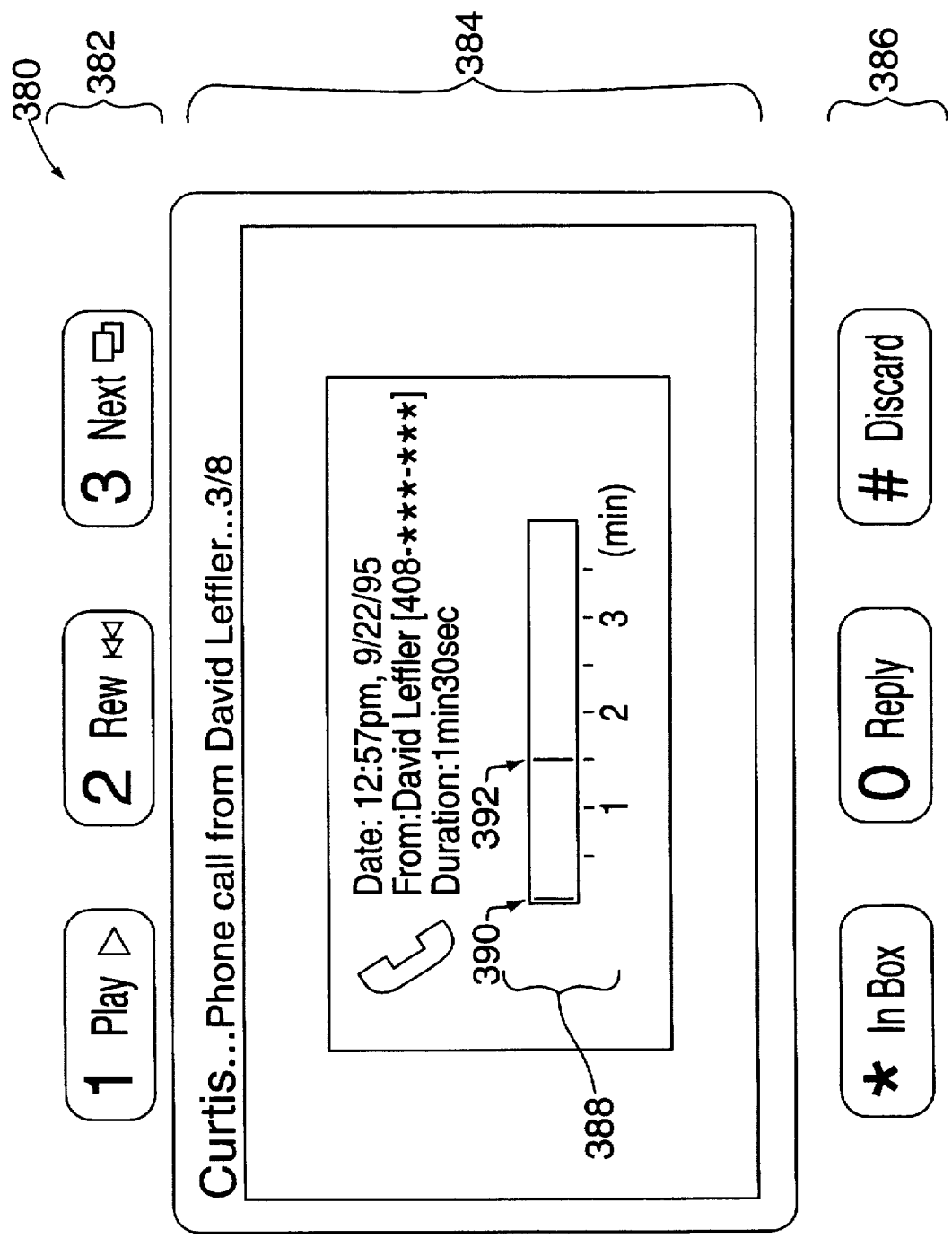
FIG. 8 is a fifth screen display.

FIG. 8 shows screen display 380 which may be accessed by activating the Next button from the display of screen display 370 of FIG. 7. Screen display 380 includes buttons at 382 and 386. Screen display 380 also includes a voice-mail window at 384 that shows details of a voice-mail message to the user. Voice-mail window 384 includes time bar 388 along with time indicator 390 and end-of-message indicator 392. Play and Rewind buttons are provided as buttons "1" and "2" so that the user may control playback of the voice-mail message. In a preferred embodiment, the user activates the Play function by depressing "1" on the keypad of the base station or the user's handheld communicator and, similarly, activates the Rewind function by depressing "2" on either device. Once the message is playing, the Play button changes to a Pause button so that the user may stop the message at any point in time. The voice-mail message is played either through electronics built into the device from which the user is executing the user interface or from the handheld communicator.

Figure 9:
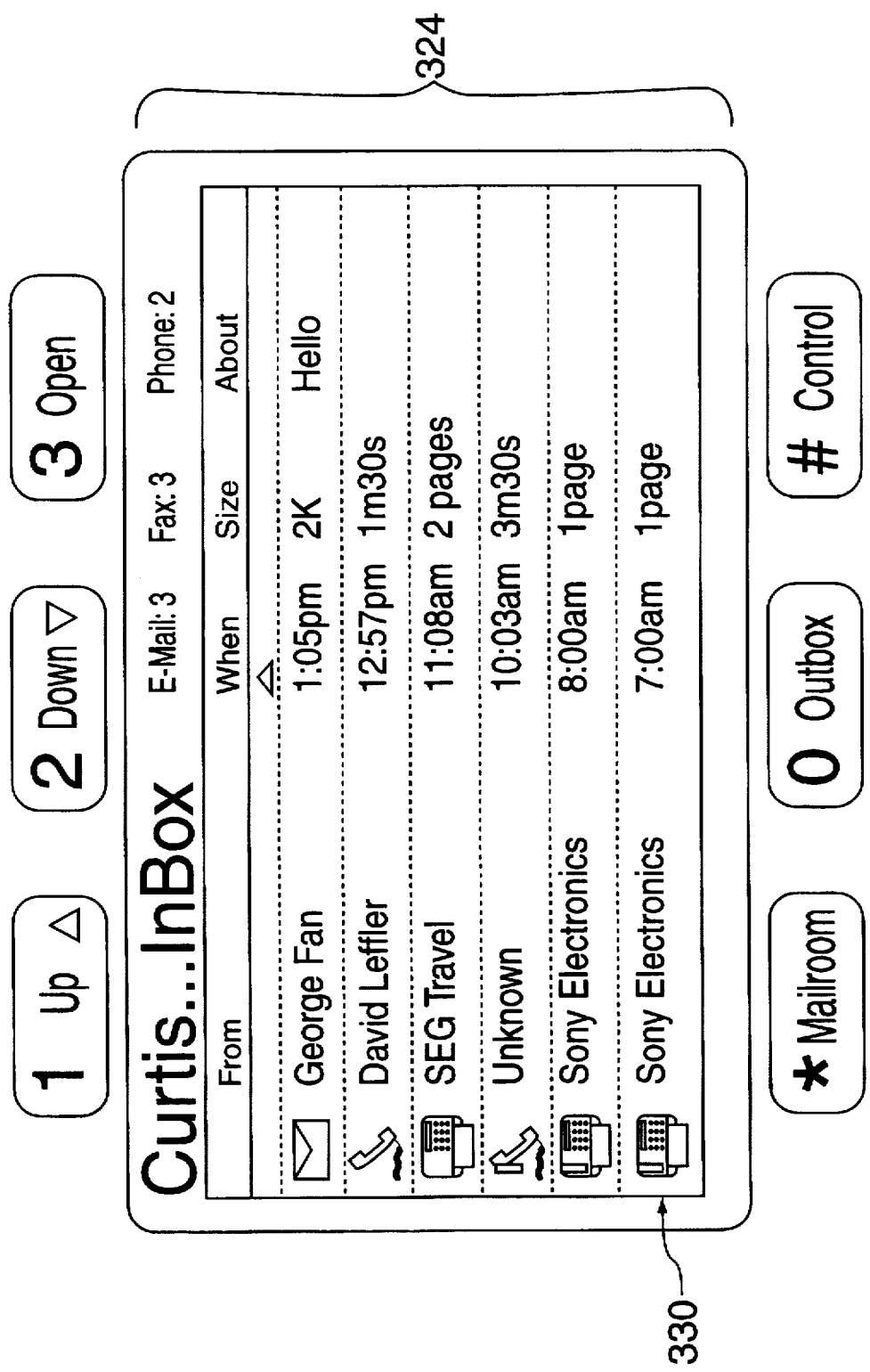
FIG. 9 is a sixth screen display.

FIG. 9 shows the screen display of FIG. 5 after the menu in In Box window at 324 has been scrolled down by 1 item. Also, shaded bar 330 is now focusing on a fax message item at the bottom of the window. Note that the function of button "1" has now been designated as "up" to allow the user to move shaded bar 330 upwards and to scroll the list downwards when the user attempts to move the shaded bar beyond the top of the screen.

Figure 10:
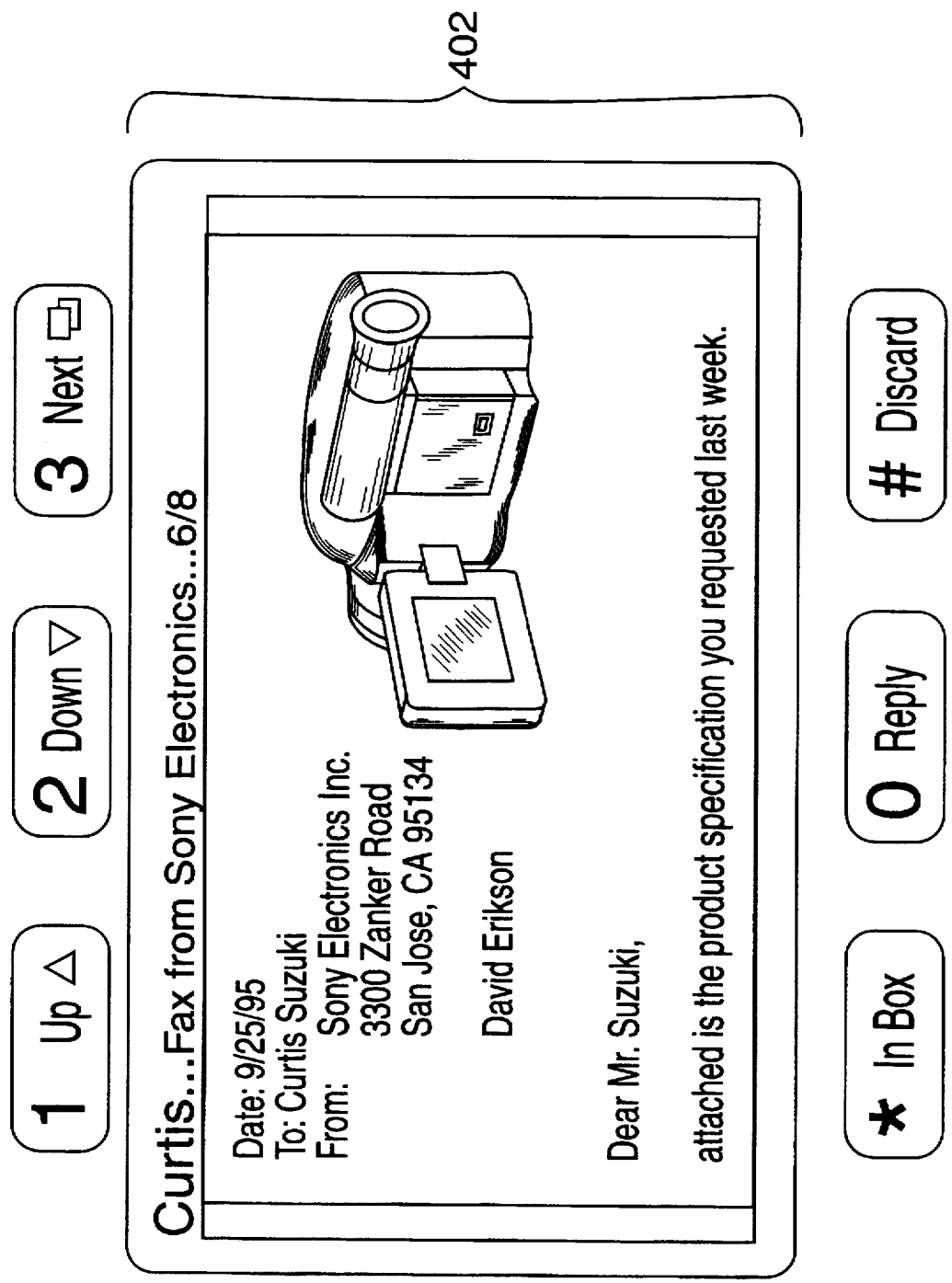
FIG. 10 is a seventh screen display.

FIG. 10 shows the screen display after the user selects the fax item focused on in FIG. 9. Fax window 402 displays the fax image in a manner similar to the display of e-mail messages discussed above in connection with FIGS. 6 and 7. By using buttons 1 and 2 the user is able to scroll the fax image within the window to view the entire image. When the user reaches the bottom of the fax image other pages of the fax, if any, are displayed. Additional features are possible such as a page counter, zoom function, etc.

Figure 11:
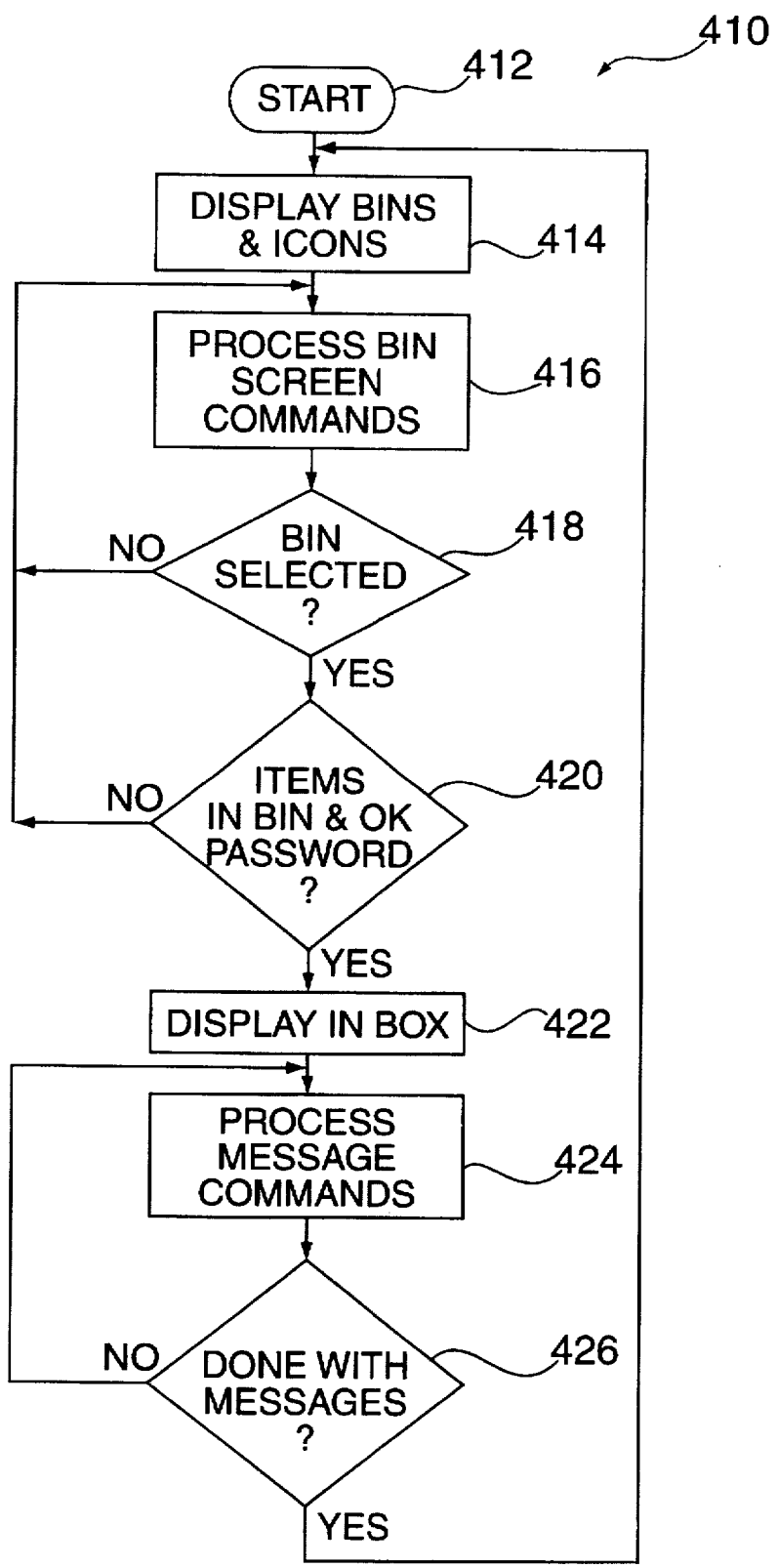
FIG. 11 is a flowchart illustrating the broad logical flow of the processing of the user interface.

FIG. 11 is a flowchart 410 illustrating the broad logical flow of the processing discussed above in connection with the user interface of the present invention. The steps of flowchart 410 may be performed by a processor and related subsystems within the base station, handheld communicator, or other device of the personal communications routing system of the present invention shown in FIG. 1. In general, the steps of flowcharts presented in this specification may be implemented in any suitable programming language such as "C," PASCAL, FORTRAN, BASIC, assembly language, etc., or in a combination of such languages. Any suitable computer programming technique may be used for a software design to implement the steps, such as procedural or object oriented programming, parallel or distributed processing, interrupt driven or polled event processing, etc. The software may operate under a generally available operating system such as Windows by Microsoft, Corp. or the Macintosh Operating System by Apple Computer, Inc. Steps may be modified, added to, or taken away from, those shown in the flowcharts while still achieving the method steps and apparatus elements described in this specification and recited in the claims. The processing in a single step may be broken into two or more steps. Also, in some embodiments, two or more steps may be accomplished at the same time, or their tasks interleaved. The sequencing, or routing, of the steps may also be changed. Each flowchart is but one instance of a primitive example of the logic used to achieve a function in a preferred embodiment of the present invention.

For purposes of discussion, the cumulative steps of a flowchart are referred to as constituting a single "routine," or program, although they may be implemented in two or more routines, programs, processes, etc. Flowchart steps may also be distributed among processors residing in the same or different devices.

The routine of flowchart 410 is entered at 412 when the base station, or other device executing the routine (i.e., the "host device"), is powered up. Step 414 is executed to generate the screen display of FIG. 4. Step 416 is then executed to process the key or button commands, and any other commands, associated with the screen display of FIG. 4 as discussed above.

At step 418 a check is made as to whether a user has selected their corresponding bin. In the preferred embodiment this corresponds to a user pushing a key (0–9) on the twelve key keypad on the handheld communicator, base station, telephone or other device. The user may also select a bin by alternate controls as discussed above. If no bin is selected processing returns to step 416 where bin screen commands are continued to be processed. If, however, a bin selection is made and detected at step 418, processing continues to step 420.

At step 420 a check is made for messages associated with the selected bin. Also, in the preferred embodiment, the user is prompted for a password. If there are no items associated with the user's bin, or if the user fails to enter the correct password, execution returns to step 416. However, if there are items, and the correct password has been entered, execution proceeds to step 422.

At step 422 the host system generates the In Box display discussed in connection with FIGS. 5 and 9. Step 424 handles the processing of subsequent commands from the user to display and otherwise access and manipulate the user's messages as discussed in connection with FIGS. 6–8. At step 426 a check is made as to whether the user has finished viewing messages. If not, processing returns to step 424 where additional message screens or the In Box screen may again be presented for further viewing of messages by the user. If, at step 426, it is determined that no more messages are to be viewed execution then returns to step 414 where the main screen display of bins and icons is shown so that additional user messages can be viewed.

Next, the rule processing feature of the present invention is discussed.

Rule Processing

A feature of the present invention allows predefined rules to be used to control the routing, or other processing, of messages received by the personal communications routing system of the present invention. Use of such rules allows users to automatically forward, save, duplicate and distribute messages without any action on the part of the user. Many other operations are possible such as to send an automatic response, refuse delivery, etc. Rule processing is discussed further in the co-pending applications referenced at the beginning of this section.

Table I shows examples of two rules that are associated with two users designated as USER1 and USER2.

Rule 1:
  If any e-mail to USER1 arrives,
  → forward it to USER1's PC; and
  → send a page to USER1's pager.
Rule 2:
  If any e-mail to USER2 arrives,
  → forward it to USER2's PIC;
  → send a copy to USER1; and
  → send a page to USER2's pager.

TABLE I

Following the rules in Table I, each e-mail that is sent to USER1 is forwarded to USER1's PC. Also, a page goes out to USER1 to alert USER1 that e-mail has been received. Similarly for USER2, each e-mail sent to USER2 results in the e-mail being forwarded to USER2's personal information communicator, a copy of the e-mail is sent to USER1 and a page is sent to USER2. Note that, if an e-mail is sent to USER2, the e-mail is subject to both USER2's rules and USER1's rules since USER2's rules command that the e-mail also be subsequently sent to USER1. Other useful rules include screening messages based on the sender's name (made possible by utilizing the "caller ID" feature provided by the telephone company), categorizing messages according to sender's name or date of origin, etc. In a preferred embodiment, a user is provided with pre-made rules to choose from and may also design custom rules. Rules may be time-triggered so that, for example, forwarding to a user's computer at home occurs only during non-business hours.

Figure 12:
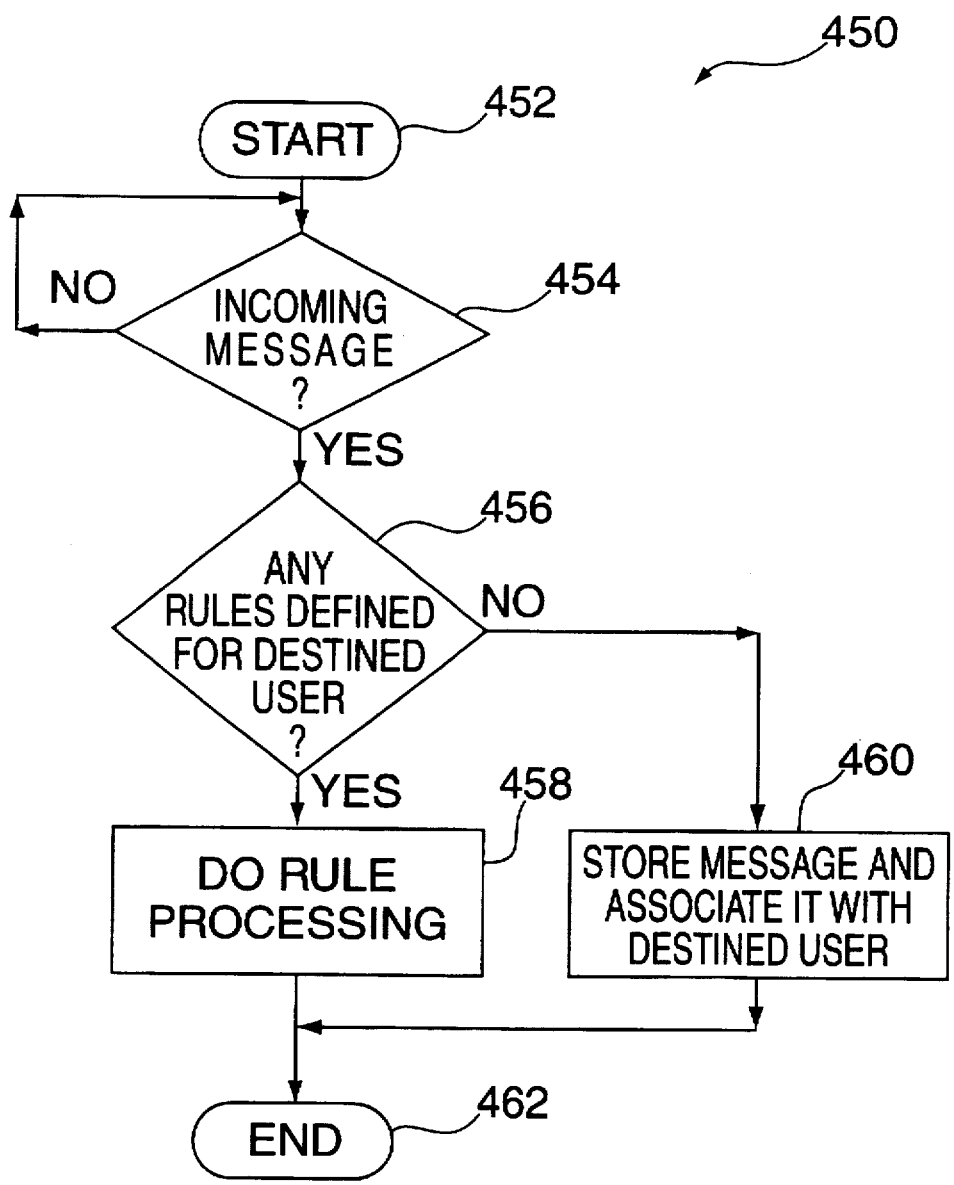
FIG. 12 is a flowchart illustrating the steps in a routine for achieving the rule processing feature of the present invention.

FIG. 12 shows flowchart 450 illustrating the steps in a routine for achieving the rule processing feature of the present invention. The routine of flowchart 450 is preferably executing concurrently with the routine of flowchart 410 of FIG. 11 so that user command processing and message rule processing are performed together in real time.

The routine of FIG. 12 is entered at step 452. Then, the routine, at step 454, constantly monitors data coming from external communication networks to determine whether a message or other information has been received. When a message has been received step 456 is executed to check whether any predefined rules exist for whichever user is the destined receiver of the message. If no rules exist then the message is simply stored in association with the destined user so that the user sees an icon in that user's bin as discussed above with respect to the user interface of the present invention. The rule processing is then exited at step 462.

However, if rules exist for the destined user, step 458 is executed to process the rules. This results in routing of the message, paging, screening or other processing as determined by the rules.

The user interface and rule processing features of the present invention have been discussed. The present invention provides a personal communications routing system with an improved user interface that is uniform among the different communication networks, information types and devices which the system is designed to handle. The rule processing gives a user the flexibility of automated message screening, routing and other control. Further features and functionality will be apparent to one of skill in the art and the embodiments set forth in the text and Figures of this specification and claims are to be regarded as merely illustrative of but one embodiment, the scope of the invention to be determined solely by the appended claims.

We claim:

1. A method for accessing information in an electronic communications system, the system including a processor coupled to a display screen, memory, and first and second electronic communication networks, the system further comprising a mobile telephone handset including a telephone keypad wherein the mobile telephone handset is remote from the processor, wherein first and second users of the system each have a unique user identifier, the method comprising the following steps:

having areas on the display screen visually analogous to, and associated with, areas on the telephone keypad;

using the processor to display the first user's identifier on the display screen in a first area of the display screen;

using the processor to display the second user's identifier on the display screen in a second area of the display screen;

using the processor to receive first information for the first user from the first network, store the first information into the memory, and display a first icon within the first area in response to the receipt of the first information;

using the processor to receive second information for the first user from the second network, store the second information into the memory, and display a second icon within the first area in response to the receipt of the second information;

accepting signals from the user input device to specify a user; and if the specified user is the first user then performing the step of displaying at least a portion of the information for the first user on the display screen.

2. The method of claim 1, further comprising the steps of:

wherein the step of accepting signals from the user input device to specify a user includes the substep of accepting signals from the user input device to specify an icon in the first area;

using the processor to display the first information on the display screen if the specified icon was the first icon; and using the processor to display the second information on the display screen if the specified icon was the second icon.

3. The method of claim 1, wherein the system is coupled to a plurality of information networks, wherein the plurality of information networks includes an electronic mail network, a fax network and a voice mail network, the method further comprising the steps of:

defining an electronic mail icon;

defining a fax icon;

defining a voice mail icon;

receiving incoming information from a plurality of the networks;

determining the user for which each incoming information is designated;

selecting a defined icon according to the network from which the incoming information was received; and displaying the selected icon in the area corresponding to the determined user.

4. The method of claim 3, wherein the system includes a keypad having a plurality of keys, wherein each key is associated with a number, wherein the keypad is coupled to the processor, wherein each user of the system is assigned a different user area on the display screen, the method further comprising the steps of:

associating a key on the keypad with a user area;

wherein the step of accepting signals from the user input device to specify a user includes the substeps of accepting signals from the keypad to indicate that a key has been pushed;

determining the user area associated with the pushed key; and designating as the specified user the user assigned to the determined user area.

5. The method of claim 4, wherein the keypad is a standard twelve key telephone keypad, the method comprising the steps of:

displaying user areas and numerals on the display screen in an arrangement that corresponds with the keys on the keypad so that a user area in the top left hand corner of the display screen has the numeral "1" proximately associated with it, a user area in the top middle portion of the display screen has the numeral "2" proximately associated with it and a user area in the top right corner of the display screen has the numeral "3" proximately associated with it; and associating user areas with keys on the keypad according to the corresponding arrangement so that a keypad key labeled "1" on the keypad is used to access information for the user associated with the user area having the numeral "1" proximately associated with it.

6. The method of claim 5, wherein each user identifier includes a name of a user, the method further comprising the steps of:

wherein the step of displaying user areas and numerals on the display screen includes the substep of displaying an image suggestive of a key on the keypad; and displaying the name of a user proximate to the user area associated with the user.

7. The method of claim 1, further comprising the steps of:

storing, in the memory, a rule for processing received information for the first user; and using the stored rule to process information received for the first user.

8. The method of claim 7, wherein the rule specifies how information is to be routed.

9. The method of claim 8, wherein the rule specifies how information received during a predefined time interval is to be routed.

10. The method of claim 8, wherein the rule specifies how information is to be routed conditioned upon the sender of the information.

11. The method of claim 7, wherein the rule specifies that information is to be copied to the second user.

12. The method of claim 7, wherein the rule specifies that the first user it to be alerted by paging upon receipt by the processor of information.

13. A method for providing a user interface in a digital system, wherein the digital system includes a processor coupled to a memory and a display screen, wherein the digital system further comprises a mobile telephone handset including a telephone keypad, wherein the telephone handset is remote from the processor, wherein the user interface is operated by a plurality of users, wherein the keypad includes a plurality of keys in a fixed configuration, wherein the memory includes items associated with the users, the method comprising the steps of:

displaying, with the processor, a plurality of images on the display screen, one per key, wherein the arrangement of the plurality of images on the display screen is analogous to the fixed configuration of the keys on the keypad so that for each image there is a corresponding key;

associating a user with an image on the display screen;

accepting from the keypad a signal indicating that a key was pressed;

determining, with the processor, the image from the plurality of images that corresponds to the pressed key;

determining the user associated with the determined image;

retrieving an item associated with the determined user; and displaying the retrieved item on the display screen.

14. An apparatus for providing a user interface in a digital system, the apparatus comprising:

a processor;

a memory coupled to the processor, wherein the memory includes items associated with users of the user interface;

a mobile telephone handset including a telephone keypad, wherein the mobile telephone handset is remote from the processor, wherein the keypad includes a plurality of keys in a fixed configuration;

a display screen coupled to the processor;

display means for displaying a plurality of images on the display screen, wherein one image is displayed per key, wherein the arrangement of the plurality of images on the display is analogous to the fixed configuration of the keys on the keypad so that for each image there is a corresponding key;

association means for associating a user with an image on the display screen;

determining means for determining a user associated with the image corresponding to a pressed key; and retrieving means for retrieving from the memory, and displaying on the display screen, an item associated with the determined user.

15. A method for accessing information in an electronic communications system, the system including a processor coupled to a display screen, memory, and first and second electronic communication networks, the system further comprising a mobile telephone handset including a telephone keypad, wherein the telephone handset is remote from the processor, wherein first and second users of the system each have a unique user identifier, the method comprising the following steps:

having areas on the display screen visually represented similar to and associated with the keys on the telephone handset device;

using the processor to display the first user's identifier on the display screen in a first area of the display screen;

using the processor to display the second user's identifier on the display screen in a second area of the display screen;

using the processor to receive first information for the first user from the first network, store the first information into the memory, and display a first icon within the first area in response to the receipt of the first information;

using the processor to receive second information for the first user from the second network, store the second information into the memory, and display a second icon within the first area in response to the receipt of the second information;

accepting signals from the user input device to specify a user; and if the specified user is the first user then performing the step of displaying at least a portion of the information for the first user on the display screen.

16. The method of claim 15, further comprising the steps of:

wherein the step of accepting signals from the user input device to specify a user includes the substep of accepting signals from the user input device to specify an icon in the first area;

using the processor to display the first information on the display screen if the specified icon was the first icon; and using the processor to display the second information on the display screen if the specified icon was the second icon.

17. The method of claim 15, wherein the system is coupled to a plurality of information networks, wherein the plurality of information networks includes an electronic mail network, a fax network and a voice mail network, the method further comprising the steps of:

defining an electronic mail icon;

defining a fax icon;

defining a voice mail icon;

receiving incoming information from a plurality of the networks;

determining the user for which each incoming information is designated;

selecting a defined icon according to the network from which the incoming information was received; and displaying the selected icon in the area corresponding to the determined user.

18. The method of claim 15, wherein the system includes a keypad having a plurality of keys, wherein each key is associated with a number, wherein the keypad is coupled to the processor, wherein each user of the system is assigned a different user area on the display screen, the method further comprising the steps of:

associating a key on the keypad with a user area;

wherein the step of accepting signals from the user input device to specify a user includes the substeps of accepting signals from the keypad to indicate that a key has been pushed;

determining the user area associated with the pushed key; and designating as the specified user the user assigned to the determined user area.

19. The method of claim 18, wherein the keypad is a standard twelve key telephone keypad, the method comprising the steps of:

displaying user areas and numerals on the display screen in an arrangement that corresponds with the keys on the keypad so that a user area in the top left hand corner of the display screen has the numeral "1" proximately associated with it, a user area in the top middle portion of the display screen has the numeral "2" proximately associated with it and a user area in the top right corner of the display screen has the numeral "3" proximately associated with it; and associating user areas with keys on the keypad according to the corresponding arrangement so that a keypad key labeled "1" on the keypad is used to access information for the user associated with the user area having the numeral "1" proximately associated with it.

20. The method of claim 19, wherein each user identifier includes a name of a user, the method further comprising the steps of:

wherein the step of displaying user areas and numerals on the display screen includes the substep of displaying an image suggestive of a key on the keypad; and displaying the name of a user proximate to the user area associated with the user.

21. The method of claim 15, further comprising the steps of:

storing, in the memory, a rule for processing received information for the first user; and using the stored rule to process information received for the first user.

22. The method of claim 21, wherein the rule specifies how information is to be routed.

23. The method of claim 22, wherein the rule specifies how information received during a predefined time interval is to be routed.

24. The method of claim 22, wherein the rule specifies how information is to be routed conditioned upon the sender of the information.

25. The method of claim 21, wherein the rule specifies that information is to be copied to the second user.

26. The method of claim 21, wherein the rule specifies that the first user it to be alerted by paging upon receipt by the processor of information.

27. An apparatus for providing a user interface in a digital system, the apparatus comprising:

a processor;

a memory coupled to the processor, wherein the memory includes items associated with users of the user interface;

a mobile telephone handset including a telephone keypad wherein the mobile telephone handset is remote from the processor, wherein the keypad includes a plurality of keys in a fixed configuration;

a display screen coupled to the processor;

display means for displaying a plurality of images on the display screen, wherein one image is displayed per key, wherein the arrangement of the plurality of images on the display is analogous to the fixed configuration of the keys on the keypad so that for each image there is a corresponding key;

association means for associating a user with an image on the display screen;

determining means for determining a user associated with the image corresponding to a pressed key; and retrieving means for retrieving from the memory, and displaying on the display screen, an item associated with the determined user.

28. A method for accessing information in an electronic communications system, the system including a processor coupled to memory, an output device, a mobile telephone handset including a telephone keypad wherein the mobile telephone handset is remote from the processor, and first and second electronic communication networks, wherein first and second users of the system each have a unique user identifier, wherein areas on the user input device are associated with a unique user identifier, the method comprising the following steps:

using the processor to communicate the first user's identifier on the output device;

using the processor to communicate the second user's identifier on the output device;

using the processor to receive first information for the first user from the first network, store the first information into the memory, and communicate receipt of the first information in response to receipt of that information;

using the processor to receive second information for the first user from the second network, store the second information into the memory, and communicate receipt of the first information in response to receipt of that information;

accepting signals from the user input device to specify a user; and if the specified user is the first user then performing the step of communicating at least a portion of the information for the first user on the output device.

29. The method of claim 28, wherein the output device communicates receipt of the first information in response to receipt of that information, the method comprising:

if the specified user is the first user, then communicating at least a portion of the information for the specified user via audio or tactile signals to first user.

30. The method of claim 29, wherein the system is coupled to a plurality of information networks, wherein the plurality of information networks includes an electronic mail network, a fax network and a voice mail network, the method further comprising the steps of:

defining an electronic mail signal type or pattern;

defining a fax signal type or pattern;

defining a voice mail signal type or pattern;

receiving incoming information from a plurality of the networks;

determining the user for which each incoming information is designated;

selecting a defined signal type or pattern according to the network from which the incoming information was received; and storing the selected signal type in the area corresponding to the determined user.

31. The method of claim 28, wherein the system includes a keypad having a plurality of keys, wherein each key is associated with a number, wherein the keypad is coupled to the processor, the method further comprising the steps of:

associating a key on the keypad with a user;

wherein the step of accepting signals from the user input device to specify a user includes the substeps of accepting signals from the keypad to indicate that a key has been pushed;

determining the user associated with the pushed key.

32. The method of claim 28, further comprising the steps of:

storing, in the memory, a rule for processing received information for the first user; and using the stored rule to process information received for the first user.

33. The method of claim 32, wherein the rule specifies how information is to be routed.

34. The method of claim 33, wherein the rule specifies how information received during a predefined time interval is to be routed.

35. The method of claim 33, wherein the rule specifies how information is to be routed conditioned upon the sender of the information.

36. The method of claim 32, wherein the rule specifies that information is to be copied to the second user.

37. The method of claim 32, wherein the rule specifies that the first user it to be alerted by paging upon receipt by the processor of information.

* * * * *